US009948995B2

United States Patent
Cannon

(10) Patent No.: US 9,948,995 B2
(45) Date of Patent: *Apr. 17, 2018

(54) METHODS AND APPARATUS FOR SUPPORTING SHARING OF CONTENT BETWEEN MOBILE COMMUNICATIONS DEVICES AND HOME BASED DEVICES

(71) Applicant: Time Warner Cable Enterprises LLC, New York, NY (US)

(72) Inventor: Matthew Cannon, Sterling, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/496,679

(22) Filed: Sep. 25, 2014

(65) Prior Publication Data
US 2015/0020120 A1 Jan. 15, 2015

Related U.S. Application Data

(63) Continuation of application No. 12/958,078, filed on Dec. 1, 2010, now Pat. No. 8,849,184.
(Continued)

(51) Int. Cl.
*H04H 20/71* (2008.01)
*H04N 21/647* (2011.01)
(Continued)

(52) U.S. Cl.
CPC ... *H04N 21/64746* (2013.01); *H04L 65/1083* (2013.01); *H04N 21/4126* (2013.01); *H04N 21/4788* (2013.01); *H04N 21/6181* (2013.01)

(58) Field of Classification Search
CPC .............. H04N 21/4788; H04N 7/147; H04N 21/4126; H04N 21/42203; H04N 21/4223; H04N 21/4334; H04N 21/443; H04N 21/6125; H04N 21/8166; H04N 5/76; H04N 7/15; H04N 7/17318; H04N 19/00;
(Continued)

(56) References Cited

U.S. PATENT DOCUMENTS

2006/0271687 A1* 11/2006 Alston .................. H04N 7/147
709/227
2009/0010485 A1* 1/2009 Lamb ..................... H04N 7/148
382/100
(Continued)

*Primary Examiner* — Golam Sorowar
(74) *Attorney, Agent, or Firm* — Straub & Straub; Michael P. Straub; Stephen T. Straub

(57) ABSTRACT

Methods and apparatus for allowing a telephone user to share captured audio and/or video with a set top box user are described. The methods and apparatus of the present invention can be implemented without the need for a called party to support video conferencing and/or have a computer system. In various embodiments a telephone call is used to first contact a party to who content from a telephone may be streamed, e.g., in real time. Assuming the contacted party is interested a video session is established with a STB or other device corresponding to the called party and video content delivered from the cell phone. Audio may also be streamed with the video and/or the initial telephone call is maintained while video content is delivered allowing for bi-direction communication via the calling party and called party's telephones.

12 Claims, 8 Drawing Sheets

Related U.S. Application Data

(60) Provisional application No. 61/412,577, filed on Nov. 11, 2010.

(51) Int. Cl.
    *H04N 21/61*     (2011.01)
    *H04N 21/41*     (2011.01)
    *H04N 21/4788*     (2011.01)
    *H04L 29/06*     (2006.01)

(58) Field of Classification Search
    CPC ........... H04N 19/103; H04N 21/42204; H04N 21/43637; H04L 12/1818; H04L 12/189; H04L 12/2818; H04L 12/5835; H04L 2012/2849; H04L 51/066; H04L 65/1006; H04L 65/1016; H04L 65/1043; H04L 65/1083; H04L 65/4084
    See application file for complete search history.

(56) References Cited

U.S. PATENT DOCUMENTS

2010/0149302 A1*   6/2010   Malik ................ H04L 12/1818
                                                      348/14.08
2010/0254370 A1*   10/2010   Jana .................... H04L 65/1016
                                                      370/352

* cited by examiner

METHODS AND APPARATUS FOR SUPPORTING SHARING OF CONTENT BETWEEN MOBILE COMMUNICATIONS DEVICES AND HOME BASED DEVICES

RELATED APPLICATIONS

The present application is a continuation of U.S. patent application Ser. No. 12/958,078 filed Dec. 1, 2010 which is hereby expressly incorporated by reference in its entirety, and which claims the benefit of the filing date of U.S. Provisional Application 61/412,577 filed Nov. 11, 2010 which is hereby expressly incorporated by reference in its entirety.

FIELD OF THE INVENTION

The present invention relates to methods and apparatus which support and facilitate sharing of content, e.g., image and/or audio content, between customer premise devices, e.g., set top box, and mobile devices including, e.g., cell phones, etc.

BACKGROUND OF THE INVENTION

It is commonplace for individuals to carry cell phones with them. Most cell phones now include cameras and, in addition to capturing audio, can capture images corresponding to the audio being viewed.

While having a camera in a cell phone allows a cell phone user to capture images and send them at a later time to friends and/or family, in many cases it would be desirable if friends and/or family could view and listen to an ongoing event in real time.

For example, a parent at a sports game in which a child is playing might want to be able to send images, preferably with accompanying audio, to a device from which the other parent can watch the game in real time. Similarly it might be desirable to send images and/or audio from a party or graduation event in real time. The number of events which individuals, e.g., friends and/or family's might want to share are countless.

While cell phones have gathered wide spread adoption, many people have also adopted high speed Internet and/or other services which allow for video data to be delivered to one or more devices in their home. For example cable services may allow for video to be delivered via on-demand servers or via IP over coax. Fiber optic data delivery systems are also likely to grow as fiber to the home gains in acceptance and deployment increases.

While various data delivery services exist which could support the data rates required to support two way audio delivery and at least one way video delivery, there has yet to be convenient methods which are widely applicable for delivering video and/or audio to a party not using a computer and/or video conferencing system from a telephone.

In view of the above discussion, it should be appreciated if methods and/or apparatus could be developed which would allow video alone or in combination with audio to be delivered, e.g., in real time, to friends and family without requiring the use of computer and/or video conferencing systems at the friend of family members location. While not necessary, it would be desirable if at least some embodiments supported bidirectional audio and could be implemented using exiting set top boxes and cell phones.

SUMMARY OF THE INVENTION

Methods and apparatus which support and facilitate sharing of content captured on a cell phone, e.g., image and/or audio content, with one or more friends and/or family members having access to customer premise device such as a cable set top box are described. The methods and apparatus are well suited for allowing a cellphone user to establish a video and/or audio session and stream video images and captured audio in real time to a customer premise device, e.g., a set top box, associated with a friend or family member.

In accordance with some exemplary embodiments, a cell phone user call a friend or family member and inquire whether they would like to see video and/or audio from the callers cell phone. As part of the telephone call an audio connection is established between a telephone device at the called party's customer premise location and the calling party's cell phone.

If the called party declines the invitation to view the video, the call may be dropped without further action. However, if the called party expresses an interest in the video, the user making the call may activate an application on the calling party's cell phone used to trigger the sending of an invitation to accept video and/or audio via a set top box and/or television set associated with the called party. The called party's telephone number and/or other called party identification information stored in the calling party's telephone may be communicated to a network device, e.g., IP multimedia server, responsible for establishing a video connection or session with a STB associated with the called party. The video session may proceed via communication sent via a cable modem assuming the called party associated with the STB accepts the invitation to view the video.

Depending on the embodiment, the video from the cell phone may be streamed to the STB corresponding to the called party using IP signaling after the invitation is accepted. In other embodiments the video is provided to the STB as part of a video on demand session. Video on demand sessions may be used in cases where the cable modem and/or STB associated with the user do not support IP signaling.

While video is sent from the video phone for delivery to the STB, the audio connection, e.g., telephone call, with the called party's telephone may be maintained for all or a portion of the time in which video is streamed to the customer premise device associated with the called party. In other embodiments, after the initial call to the called party, e.g., friend of family, once video delivery is starts or at some other time, the telephone call is terminated. In such an embodiment the video streaming may continue well after termination of the original telephone call. In some such embodiments audio from the event being monitored is communicated along with the captured still or video images. In one such embodiment, this allows the called party to see and hear the activity at the monitored event in real time on a television or other display associated with the set top box. Streaming may continue until the sending telephone stops sending the images and/or audio or the use of the STB terminates the video session via a stop or other command to terminate the video session.

In some embodiments audio is communicated from the called party's telephone to the calling party via the telephone call with the audio from the monitored event being delivered via the STB.

While separate audio and video communications paths can be supported, e.g., with the audio being provided via the telephone call and video via an IP or Video on Demand session, in many embodiments after streaming starts, the telephone call is terminated.

The streamed video can be recorded and/or stored at the called parties customer premise location or in the network.

In various embodiments the customer premise equipment, e.g., set top box including DVR functionality, or network server which supports content delivery via a VOD session allows the user to reverse, fast forward, pause, freeze frame and/or take other actions which might be expected in a conventional VOD session. The ability of the receiving party to manipulate, forward, and/or share the video may, and in some embodiment can be restricted by digital rights management information communicated with the images sent from the cell phone used to capture the images.

Thus a user of the cell phone can restrict sharing of streamed content from the STB to other devices and/or individuals. Thus, the user of the methods and apparatus of the present invention is afforded at least some privacy control via the network server's and STB's respect for digital rights management signals. Thus, in at least some embodiments, the risk of a receiving party's forwarding of private images intended for the recipient only can be reduced or avoided.

While the methods and apparatus of the present invention share some of the features found in video conferencing equipment, they have the advantage of not requiring end users, e.g., cell phone users and called parties having access to a set top box, to acquire additional devices such as a web cams or computers to see the transmitted video.

Accordingly, the methods and apparatus of the present invention can be implemented with relatively little additional end user hardware cost beyond the items, e.g., cell phone, STB and TV many individuals already have. In many cases, as simple application can be loaded on a users cell phone with application being used to initiate and terminate video sessions in accordance with the invention, e.g., as part of or after a call is made to the friend or relative.

From a network perspective, VOD servers and/or IP multimedia servers can be used to support the services made possible through the present invention. The video and/or audio content delivery methods allow for communications system providers, e.g., cell phone and cable network providers, to provide additional service and generate revenue using hardware which may already be in the system for other purposes, e.g., the delivery of pay per view content as part of fee based VOD sessions.

Various additional features and advantages of the present invention are discussed in the detailed description which follows.

DETAILED DESCRIPTION

Figure 1:
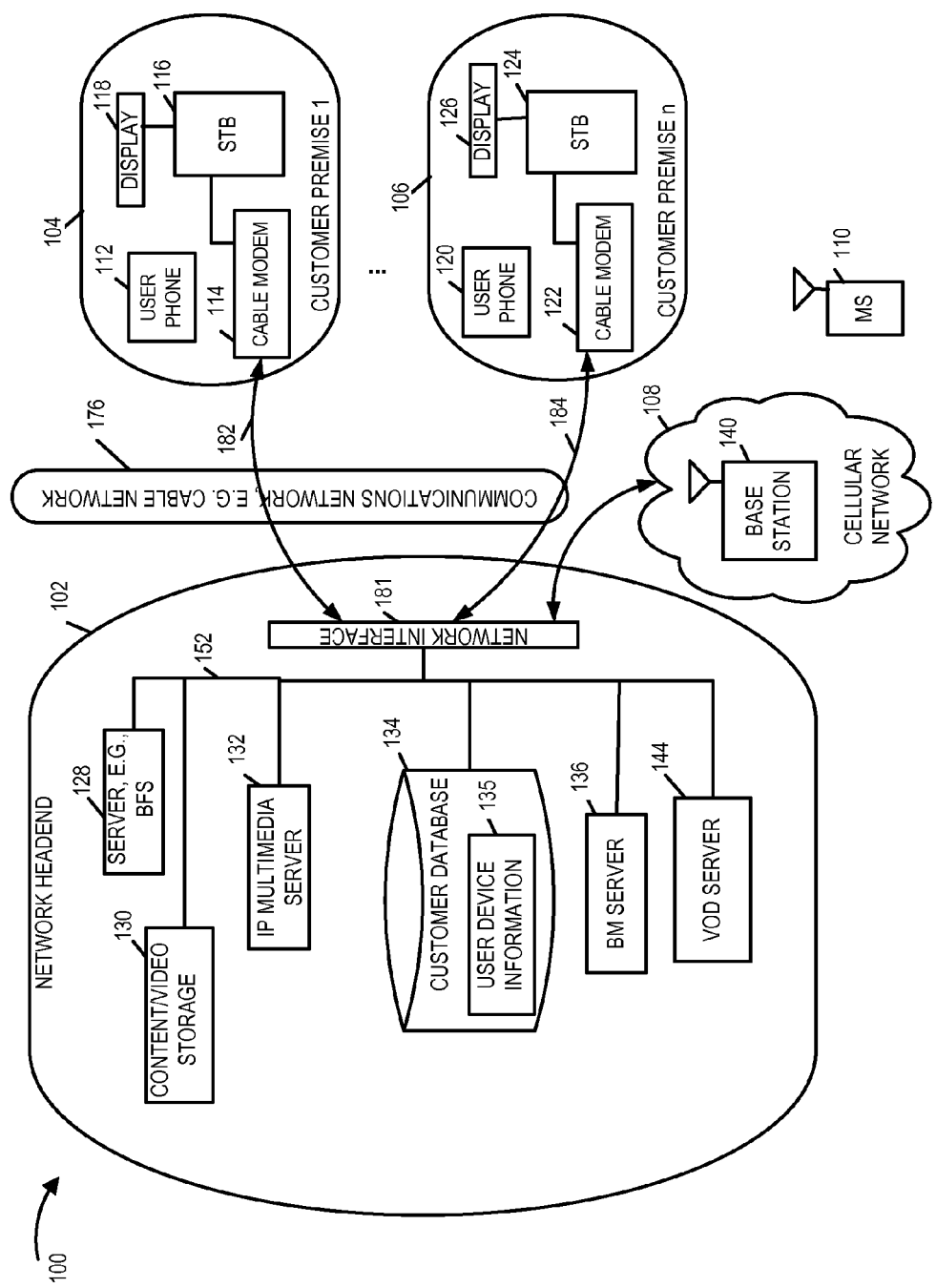
FIG. 1 illustrates an exemplary system implemented in accordance with the present invention.

FIG. 1 illustrates a system 100 implemented in accordance with one exemplary embodiment of the present invention. The system 100 shown in FIG. 1 supports content delivery, e.g., video and audio content delivery, between home devices, e.g., set top box, and mobile devices including, e.g., cell phones, etc. The system 100 includes a network headend 102, a communications network 176, e.g., a cable network, a plurality of customer premises 104, 106 in addition to a cellular network 108, and at least one mobile communications device, e.g., cell phone 110. In the discussion, cell phones are also referred to as mobile stations (MS). In various embodiments the MS 110 supports web browsing functionality and other features useful in, e.g., recording and communicating multimedia content.

The network headend 102 may be implemented at a cable network office or site including multiple servers and databases which are coupled together. In the FIG. 1 example, the headend 102 includes a server 128, e.g., a broadcast file server (BFS), content storage 130, an IP multimedia server 132, a customer database 134, a business management server 136 and a Video on Demand (VOD) server 144. The various servers and other components included in the headend 102 are coupled together by a local network 152. The local network 152 is coupled via one or more network interfaces 181 to other networks and/or devices. For example, the headend 102 is coupled via network interface 181 to communications network 176, e.g., a cable network, and is also coupled to cellular network 108 and to the Internet. The cellular network 108 includes one or more base stations 140 for transmitting to and/or receiving signals from cell phones and/or other mobile devices such as MS 110.

Via cable network 176, the devices in the network headend 102 can send video and audio content, programming related information and/or other information to set top boxes and/or computers located at the customer premises 104, 106 coupled to the cable network 176. Each customer premise 104, 106 includes a set top box 116, 124 and a display device 118, 126 which could be, e.g., external television. It should be appreciated that each of the STBs 116, 124 can be integrated in a device which also includes a display. The STBs support video and, optionally, E-mail functionality. The STBs 116, 124 can be used to send information to the network headend 102 in addition to receiving content, and other programming content and/or information from the headend 102. In addition, each customer premise 104, 106 includes a user phone, e.g., a digital phone 112, 120 and a cable modem 114, 122, each coupled to the corresponding STB device 116, 124. As shown in FIG. 1, communications link 182 traversing the service provider's cable network 176 couples cable modem 114 to the network head end 102's network interface 181. Similarly, cable modem 122 in the customer premise n 106 is coupled to the network head 102's network interface 181 via link 184 which traverses service provider cable network 176. One or more customer premises may also include computers capable of receiving and displaying video. The STBs 116, 124 may, and often do, include DVR functionality and the storage of user selected content. Although not shown, customer premise 104, 106 may also include additional STBs and display devices.

The BFS 128, among other things, is responsible for broadcasting programming content and/or other information to one or more customer STB devices including the STB 116. The IP multimedia server 132 is capable of receiving and forwarding the invitations and content received from mobile communications devices such as MS 110 to the STBs 116, 124. It should be appreciated that although generally referred to as video content, the content being sent from the mobile device MS 110 may simply be one or more images. In some embodiments the content sent from MS 110 for delivery to a set top box, e.g., STB 116, does not include audio content, e.g., voice or background sound etc., in which case the audio content is communicated from MS 110 to the customer telephone, e.g., user telephone 112. In some embodiments the content communicated from MS 110 for delivery to STB 116 includes both image and audio content. In various embodiments the communications from mobile communications device such as MS 110 is made possible via base station 140. The IP multimedia server 132 exchanges information with the STBs 116, 124 and upon receiving signaling, e.g., invitation response from the STBs 116, 124, sends the response to the video invitations back to the MS 110. In some embodiments the IP multimedia server 132 is configured to receive the video content from the MS 110 after the initial invitation and response signaling exchange between the STB 116 and the MS 110. In some such embodiments the video content, e.g., one or more images, received from the MS 110 is forwarded from the IP multimedia server 132 to the STB 116, e.g., over the cable network 176. In some embodiments the video content received by the IP multimedia server 132 is temporarily stored in the headend 102, e.g., in the content/video storage 130. In some embodiments the IP multimedia server 132 includes information mapping at least one of a telephone number, e.g., a number corresponding to telephone 112, or a user identifier identifying user of the telephone 112, to the set top box 116.

Customer database 134 includes customer information, e.g., customer account, customer subscription information, customer device capability and other billing related information. Customer database 134 also includes customer/user device information 135 which is the information regarding customer devices, e.g., STBs, cable modems etc., installed at various customer premises served by the network headend 102. The customer/user device information 135 includes, for example, customer identification and/or device identification information corresponding to the STBs and cable modem devices installed at customer premise 104, 106. BM (Business management) server 136 processes billing information corresponding to customers serviced by the network headend 102. This may include updating billing charge information in response to changes in the set top box being supplied, video on demand purchases, and/or other activity. Business management server 136 also processes bill payment information, e.g., credit card transactions, deductions from debit accounts, mail bills, and/or processes discount and/or coupon information.

In accordance with one aspect of the invention, in some embodiments a user/subscriber at customer premise 104 may receive video content at the STB 116 from a mobile device user, e.g., MS 110, as part a video on demand session with the video content being routed via the VOD server 144. Thus in some embodiments the video on demand server 144 establishes a video on demand session with the set top box 116, e.g., prior to delivering content, e.g., image and audio content, to the set top box 116 as part of the on demand session. The VOD server 144 may be, and in many cases is, a server which is also used to provide pay per view and/or other videos on demand in response to a subscriber's request made via STB 116.

In some embodiments the video on demand server 144 delivers image content obtained from the mobile device MS 110 for display while audio content is communicated from MS 110 to the user telephone 112 located at customer premise 104. The video on demand server 144, in some embodiments, delivers image content and audio content obtained from a mobile device such as the MS 110 for output after communication between the MS 110 and the user phone 112 is terminated.

Figure 2:
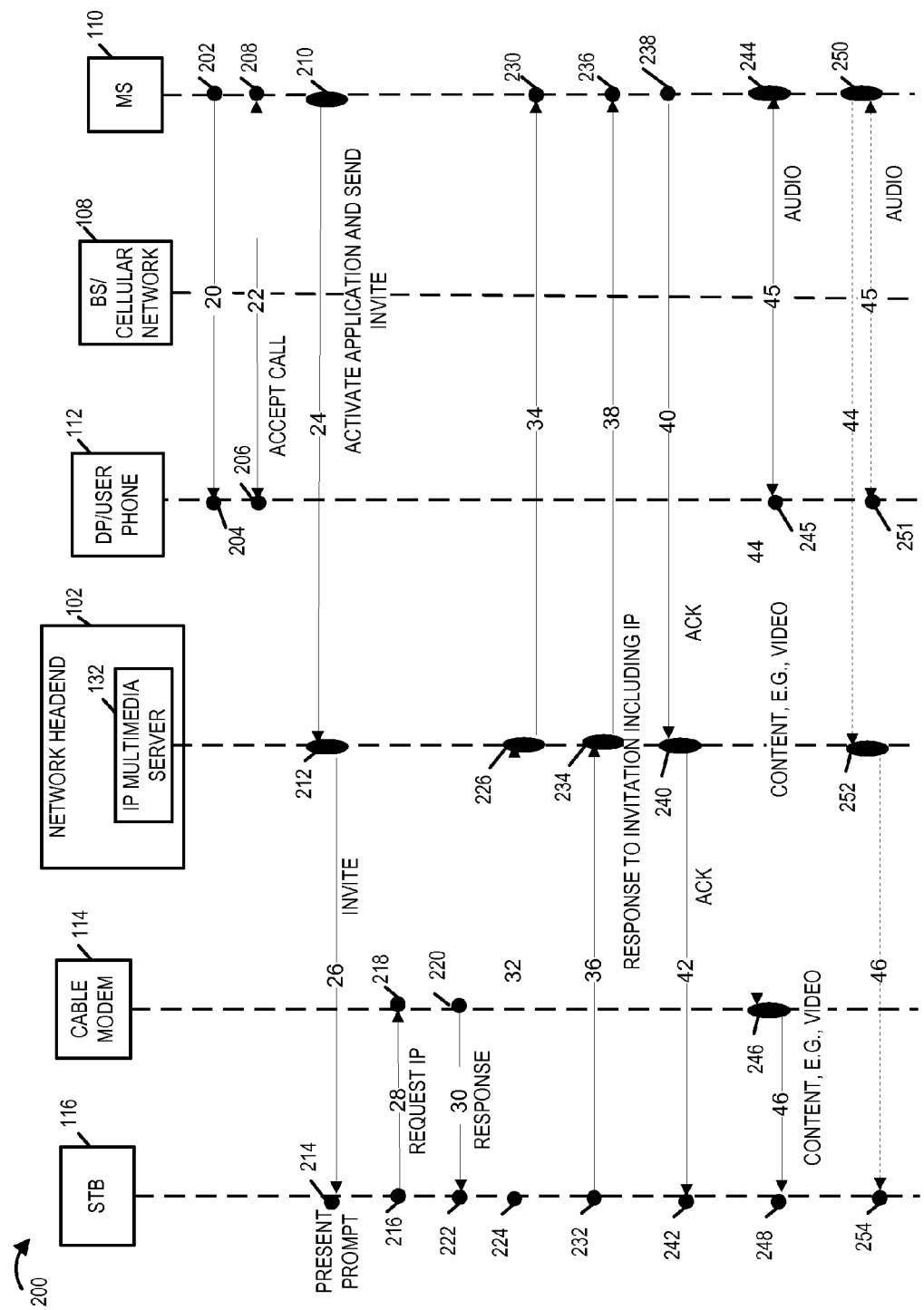
FIG. 2 illustrates signaling performed in accordance with one exemplary embodiment implemented using the system shown in FIG. 1.

Having generally discussed the exemplary system shown in FIG. 1, an exemplary method will now be discussed in detail with regard to the example shown in FIG. 2. Elements of the system 100 shown in FIG. 1 which participate in the method being explained in the FIG. 2 example are shown at the top of FIG. 2 and bear the same reference numbers as used in FIG. 1. Messages, information, content and/or signals communicated between devices are represented in FIG. 2 using arrows. The exemplary process shown in FIG. 2 will now be described in detail.

At the top of FIG. 2, various elements 200 of the system 100 which may participate in establishing communications between a STB device and a user mobile device in accordance with one embodiment of the invention, are shown. The illustrated components 200 include network head end 102, user STB 116, cable modem 114, user phone 112, BS/cellular network 108, a user mobile station MS 110.

FIG. 2, illustrates the steps and associated signaling used in one exemplary embodiment where a user of a mobile communications device MS 110 sends content, e.g., video content, to another user's (customer's) set top box device STB 116 located at customer premise 1 104, e.g., customer home. The MS 110 may belong to the same primary customer to whom the user phone 112 and STB 116 belongs, however this is not necessary in all embodiments. The process starts in step 202 where the MS 110 user calls the user home telephone 112, e.g., a digital phone, installed at the customer premise 104. The user at customer premise 104 detects the incoming call, e.g., receive a ringing tone or an alert signal, on the user phone 112 in step 204. It should be appreciated that the content being sent from MS 110 may include, e.g., one or more images, video and audio content. However as will be discussed, in some embodiments the audio content is not communicated to the STB 116, but rather communicated from MS 110 to the user telephone 112, e.g., during a telephone call between MS 110 and telephone 112 users. In step 206 the user accepts the incoming call and the two way communications starts between the user of MS 110 and the user of user phone 112 at the customer premise 104. In accordance with one feature of some embodiments, while the communication is ongoing, the user of MS 110 determines if the user at the customer premise 104 is interested in watching something that the user of MS 110 is viewing.

Consider one example where the user of MS 110 is watching a live soccer match or an event and while on the phone with the user of home phone 112, asks the other side (user of home phone 112) if he/she would like to watch the game/event, e.g., receive media content from user of MS 110. If the user at the customer premise 104 is interested in watching the soccer game, he/she may positively reply to receive the content, and if not interested the user at the customer premise1 104 may simply decline. In this example we consider that the user at the customer premise 104 is interested in watching the soccer game and therefore expresses interest in watching the game, e.g., while talking to the user of MS 110. The MS 110 user receives the home phone 112 user's consent to watch the video in step 208. Following this, in step 210 the MS 110 user activates an exemplary application on his/her cell phone MS 110 for sending content to other communications devices, to send an invitation to the user at customer premise 104 (represented by arrow 24) to view the video of the game/event. In accordance with one feature of some embodiments, when the MS 110 user wants to send an invitation to another user such as customer located at the customer premise 104, the MS 110 user activates the application on the cell phone MS 110 and puts identification information corresponding to the receiving user, e.g., e-mail address, customer telephone number etc., as the destination address so that the intended receiver can receive the invitation. The exemplary application on MS 110 is sometimes also referred to as video application. In some embodiments, when activated, the video application on MS 110 sends the invitations by default to a first server in the network headend 102, e.g., the IP multimedia server 132. In step 212 the IP multimedia server 132 located at the network headend 102 receives invitation 24 sent by the MS 110 user. In various embodiments the IP multimedia server 132 includes lookup tables for matching the customer identification information to the address of one or more STB devices located at a customer premise, e.g., customer home. Thus, when the IP multimedia server 132 receives the invitation intended to be sent to the customer at customer premise 104, the IP multimedia server 132 matches the customer e-mail address, phone number or other identification information included in the received invitation message 24 to the STB 116 address using the lookup tables. This processing is performed in step 212 and after determining the address of the customer STB 116, the IP multimedia server 132 changes the destination address in the invitation message 24 and sends the invitation to the STB 116 as shown using arrow 26.

In step 214 the STB 116 receives and processes the invitation. The STB 116 presents a prompt on the display device, e.g., display 118 at customer premise 104, prompting the user to take action, i.e., to accept the video invitation and enable viewing or to decline. For example, the STB 116 may send a display signal to the display device 118 and upon the receipt of the display signal, the user display device 118 may display, e.g., a message showing "DO YOU WANT TO WATCH THE VIDEO-SELECT YES/NO".

When the user at the customer premise 104 accepts the invitation to receive content from the MS 110, a series of signaling exchange occurs internally between various elements of system 100. The signaling exchange between various elements, following the acceptance of the invitation on the STB 116, is shown in the figure by the arrows 28 through 42. In processing step 216 the STB 116 sends a request 28 requesting the cable modem 114 for an IP address of the cable modem 114. The cable modem receives the request 28 in step 218. In step following the receipt of the request from the STB 116, the cable model 114 sends a response 30 back to the STB 116 including the IP address of the cable modem 114. In some embodiments the IP address of the cable modem 114 is treated as the IP address corresponding to the STB 116. In some embodiments the response 30 is a standard response, e.g., such as 200 OK in a SIP session establishment processes, sent in response to the IP address request 28. Following the receipt of the response 30 in step 222 from the cable modem 114, in step 224 the STB 116 sends a signal 32, e.g., such as 180 ringing, to the IP multimedia server 132. The IP multimedia server 132 receives the signal 32 in step 226. This signaling indicates to the IP multimedia server 132 that the STB 116 is trying to contact the party which sent the video invitation, i.e., the MS 110. In step 226 the IP multimedia server 132 sends another 180 ringing as signal 34 to the MS 110. The MS 110 receives the 180 ringing in step 230. The 180 ringing alerts the MS 110 that there is an incoming message and the other side is trying to contact. In some embodiments following receipt of 180 ringing from the IP multimedia server 132, the MS 110 generates an alert to inform the MS 110 user of the incoming message. The alert could be an audible alert such as a ring on the MS 110, a visible or any other perceivable alert as vibration.

In step 232 the STB 116 sends a response 36 to the invitation 26 forwarded by the IP multimedia server. The response message 36 in some embodiments is a 200 OK message and includes the IP address of the cable modem 114. The response message 36 is intended for the party that initially sent the invitation to watch the video, i.e., the MS 110. The IP multimedia server 132 receives the response message 36 in processing step 234, and forwards the response message to the MS 110 as indicated by arrow 38. The MS 110 receives the response message including the IP address in step 236. The IP address corresponding to the cable modem is communicated to the MS 110 so that the MS 110 can have a destination address for sending the video content. In step 238 the MS 110 sends an acknowledgment signal 40 (ACK) back to the IP multimedia server 132. The IP multimedia server 132 sends an ACK signal 42 to the STB 116 confirming that the intended recipient successfully received the response message including the IP address from the STB 116.

In step 244 the MS 110 initiates communicating the content to the cable modem 114 as indicated by arrow 45. The content being communicated could be, e.g., one or more images, captured video of an ongoing live event, in which case the video content could be streamed live as it is captured. In some embodiments the content could also be media content previously recorded or obtained by the MS 110 user. In some embodiments the content is communicated from the MS 110 to the cable modem 114 over the internet. In some embodiments the content being communicated to the cable modem includes still images. In at least some embodiments the content being sent from the MS 110 to the cable modem 114 does not include audio content and/or background sound. In some such embodiments the audio content and/or the background sound is communicated over the MS 110 and user home phone 112 bidirectional communication link as shown by arrow 45, while the video content is communicated to be delivered to the STB 116 in a synchronous manner. For the purpose of the example of FIG. 2, consider that the content being delivered to the set top box 116 shown using arrow 44 and 46 is the video content.

The video content is received at the cable modem 114 in step 246. In various embodiments received video content is delivered from the cable modem 114 to the STB 116 (as shown by arrow 46) over standard multimedia over Coaxial (MoCA). The STB 116 receives the video content in step 248 and displays the video content on the display device 118.

Steps 250 to 254 are optional alternative set of steps which illustrate the content being delivered to the user STB 116 through the network headend 102, e.g., via service providers cable network 176. Thus, in a given embodiment when steps 250 to 254 are implemented, then steps 244 through 248 are not performed, and the content from MS 110 may not be delivered using the IP address corresponding to the STB 116 and just through the internet. In some such embodiments the content from MS 110 is rather delivered to the STB 116 over multiple networks including, e.g., internet as well as service providers cable network 176. In step 250 the MS 110 sends the video content to the IP multimedia server 132 as indicated by dashed arrow 44. In some embodiments the video content is communicated from the MS 110 to the IP multimedia server 132 the internet. In some embodiments the content sent from the MS 110 to the IP multimedia server 132 does not include audio content and/or background sound captured by the MS 110. In some embodiments the audio content and/or the background sound is communicated over the MS 110 and user home phone 112 bidirectional communication link as shown by dashed arrow 45. The video content is received at the IP multimedia server 132 in step 252. In various embodiments received video content is delivered from the IP multimedia server 132 to the STB 116 (as shown by dashed arrow 46) over the service providers cable network, e.g., cable network 176. The IP multimedia server 132 in various embodiments performs destination address modification to deliver the video content received from the MS 110 to the STB 116. When the IP multimedia server 132 receives the video content intended to be sent to the customer at customer premise 104, the IP multimedia server 132 matches the customer e-mail address, phone number or other identification information included in the received video content to the STB 116 address, e.g., using a lookup table. This processing is performed in step 252 and after determining the address of the customer STB 116, the IP multimedia server 132 sends the video content to the STB 116 as shown using dashed arrow 46. The STB 116 receives the video content in step 254 and may instruct the display device 118 to display the video content.

Figure 3:
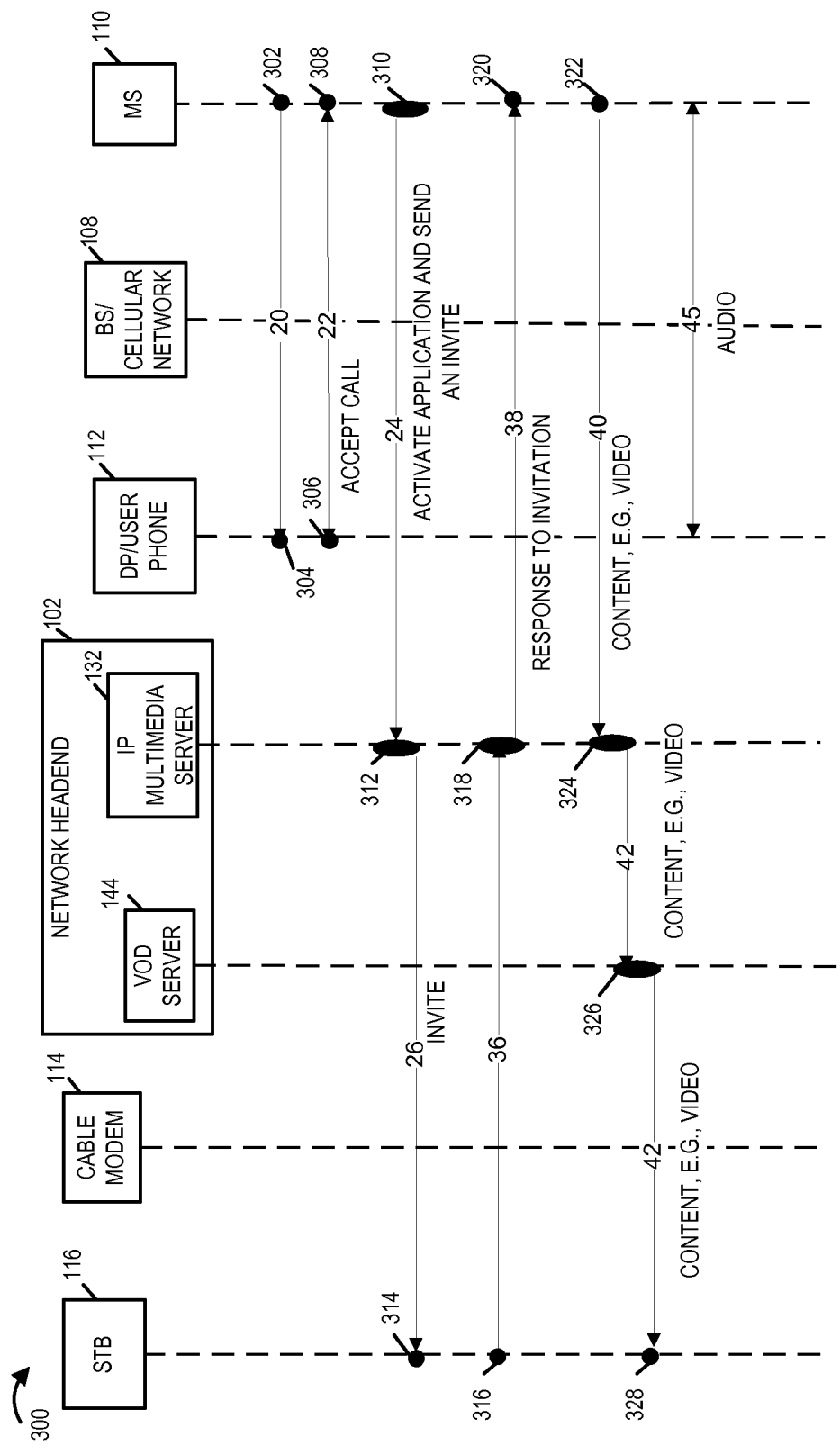
FIG. 3 illustrates signaling performed in accordance with another exemplary embodiment implemented using the system shown in FIG. 1.

FIG. 3 illustrates the steps and associated signaling used in another exemplary embodiment where the media content, e.g., video content, is delivered to the customer STB via the video on-demand (VOD) server 144. Elements of the system 100 shown in FIG. 1 which participate in the method being explained in FIG. 3 example are shown at the top of FIG. 3 and bear the same reference numbers as used in FIG. 1. Messages, information, content and/or signals communicated between devices are represented in FIG. 3 using arrows. The exemplary process shown in FIG. 3 is well suited for legacy set top boxes which may not have the capability to receive content via IP servers and/or for set top boxes which have limited IP capabilities. As should be appreciated, IP signaling, e.g., signals 28 to 38, discussed in the FIG. 2 embodiment is not needed in the FIG. 3 embodiment. In addition to the various elements already shown in FIG. 2 which include the network head end 102, user STB 116, cable modem 114, user phone 112, BS/cellular network 108, a user mobile station MS 110, the illustrated elements 300 further include the VOD server 144 located at the headend 102. For the particular example of FIG. 3 consider that the content being sent from the MS 110 for delivery to the set top box 116 is, e.g., video content, and does not include audio content and/or background sound. While not necessary in other embodiments, in this example audio content and/or the background sound is communicated over the MS 110 and user home phone 112 bidirectional communication link as shown by arrow 45, while the video content is communicated to be delivered to the STB 116 in a synchronous manner.

The exemplary process shown in FIG. 3 example starts in step 302 where the MS 110 user calls the user home phone 112, e.g., a digital phone, installed at the customer premise 104. The user at customer premise 104 detects the incoming call, e.g., receive a ringing tone or an alert signal, on the user phone 112 in step 304. In step 306 the user accepts the incoming call and the two way communications starts between the user of MS 110 and the user of user phone 112 at the customer premise 104. In accordance with one feature of some embodiments, while the communication is ongoing, the user of MS 110 determines if the user at the customer premise 104 is interested in receiving content from the user of MS 110, e.g., watch something that the user of MS 110 is viewing.

Continuing with the same example discussed with regard to FIG. 2, where the user of MS 110 is watching a soccer game and while on the phone with the user of home phone 112, asks the other side (user of home phone 112) if he/she would like to watch the game. We further assume for the purpose of this example that the user at the customer premise 104 is interested in watching the game/event and therefore agrees to watch. The MS 110 user receives the home phone 112 user's consent to watch the video in step 308. In step 310 the MS 110 user activates the video application on his/her cell phone MS 110 to send an invitation to the user at customer premise 104 (represented by arrow 24) to view the video of the game/event. As discussed above, in accordance with one feature of some embodiments, the MS 110 user activates the video application on the cell phone MS 110 and puts identification information corresponding to the receiving user, e.g., e-mail address, customer phone number etc., as the destination address. In step 312 the IP multimedia server 132 located at the network headend 102 receives invitation 24 sent by the MS 110 user. In step 312 following the receipt of the invitation intended to be sent to the STB 116 at customer premise 104, the IP multimedia server 132 matches the customer e-mail address, phone number or other identification information included in the received invitation 24 to the STB 116 address, e.g., using stored information in the multimedia server 132, e.g., lookup tables. After determining the address of the customer STB 116, e.g., MAC address of the STB 116, the IP multimedia server 132 changes the destination address in the invitation message 24 and sends an invite signal to the STB 116 as shown using arrow 26.

In step 314 the STB 116 receives and processes the invitation. The STB 116 presents a prompt on the display device, e.g., display 118 at customer premise 104, prompting the user to take action, i.e., to accept the video invitation and enable viewing or to decline. For example, the STB 116 may send a display signal to the display device 118 and upon the receipt of the display signal, the user display device 118 may display, e.g. a message showing "DO YOU WANT TO WATCH THE VIDEO-SELECT YES/NO".

In step 316 the STB 116 sends a response 36 to the invitation 26 forwarded by the IP multimedia server 132. The response message indicates that either the user at the customer premise 104 has accepted the invitation to view the video or has declined. The response message 36 is intended for the party that initially sent the invitation to watch the video, i.e., the MS 110. The IP multimedia server 132 receives the response message 36 in processing step 318, and forwards the response message to the MS 110 as indicated by arrow 38. The MS 110 receives the response message in step 320. Upon processing the received response message in step 320, the MS 110 determines how to proceed depending on the indication in the response message from the user of STB 116, i.e., whether to start sending the video if the user has accepted the invitation or refrain from sending the video in case the user at customer premise 104 has declined to watch the video. If the response message indicates that user at customer premise 104 has accepted the video invitation, then in step 322 the MS 110 initiates communicating the video content to the IP multimedia server 132 as indicated by arrow 40. It should be appreciated that unlike the embodiment discussed with regard to FIG. 2 example, in the embodiment illustrated in FIG. 3 the video content from the MS 110 is communicated to the IP multimedia server 132 and not to the cable modem 114. From the perspective of MS 110, the video content is addressed to be delivered to the user at customer premise 104. In some embodiments, when sending the video content the MS 110 user uses the identification information corresponding to the receiving user, e.g., e-mail address, customer phone number etc., as the destination address for the video content. The video content may, and in some embodiments is communicated from the MS 110 to the IP multimedia server 132 over the internet. The video content being communicated could be, e.g., captured video of an ongoing live event, in which case the content could be streamed live as it is captured. In some embodiments the video content could also be content previously recorded or obtained by the MS 110 user. In some embodiments the content being communicated includes still images. In at least some embodiments the video content being sent from the MS 110 for delivery to STB 116 does not include audio content and/or background sound. In some embodiments the audio content is communicated over the MS 110 and user home phone 112 bidirectional communication link as shown by arrow 45. The video content is received at the IP multimedia server 132 in step 324.

Further in step 324, following the receipt of content, the IP multimedia server 132 sends signal 42 including the video content to the VOD server 144, instructing the VOD server 144 to establish a video on demand session with the set top box STB 116 to communicate the video content to STB 116. In some embodiments the IP multimedia server 132 indicates, in signal 42, the identification information corresponding to STB 116, e.g., address corresponding to STB 116, with which the on demand session has to be established. In various embodiments the indicated address is, e.g., the MAC address corresponding to the STB 116. In step 326 the VOD server 144 receives the video content and establishes a video on demands session with the STB 116. Upon establishment of the video on demand session, the received video content is communicated to the STB 116 as indicated using arrow 42. In some embodiments video content is delivered from the VOD server 144 to the STB 116 over the cable network 176. The STB 116 receives the video content in step 328 and displays the video content on the display device 118. In some embodiments the video content from MS 110 is delivered via the VOD server 144 to the STB 116 and displayed to the user while audio content, e.g., voice or background sound is communicated from the MS 110 to the user telephone 112 over the MS 110 and user home phone 112 bidirectional communication link illustrated using arrow 45, e.g., as part of the phone conversation.

In some embodiments the feature of viewing the media content sent by a user of the mobile device MS 110 user to the STB 116 located at the customer premise 104 is only available as a video on demand feature. Thus in some embodiments to enable receiving/viewing of one or more images sent from the mobile communications device MS 110, the user of STB 116 has to participate in an on demand session. In one such embodiment the on-demand session is initiated at the time when the user at customer premise 104 accepts the invitation (invite signal 24) sent from MS 110. When the invitation is displayed to the user prompting the user to take action, i.e., accept or decline, the user may also be asked if the user agrees to view the video as on demand content. In some embodiments the customer at customer premise 1 104, e.g., user of STB 116, is asked to agree to pay a charge, e.g., some standard charge, for receiving the content.

While some examples discussed above have been used to describe various features, the method used in some embodiments will become even clearer when considered in view of the flow chart shown in FIG. 4.

Figure 4A:
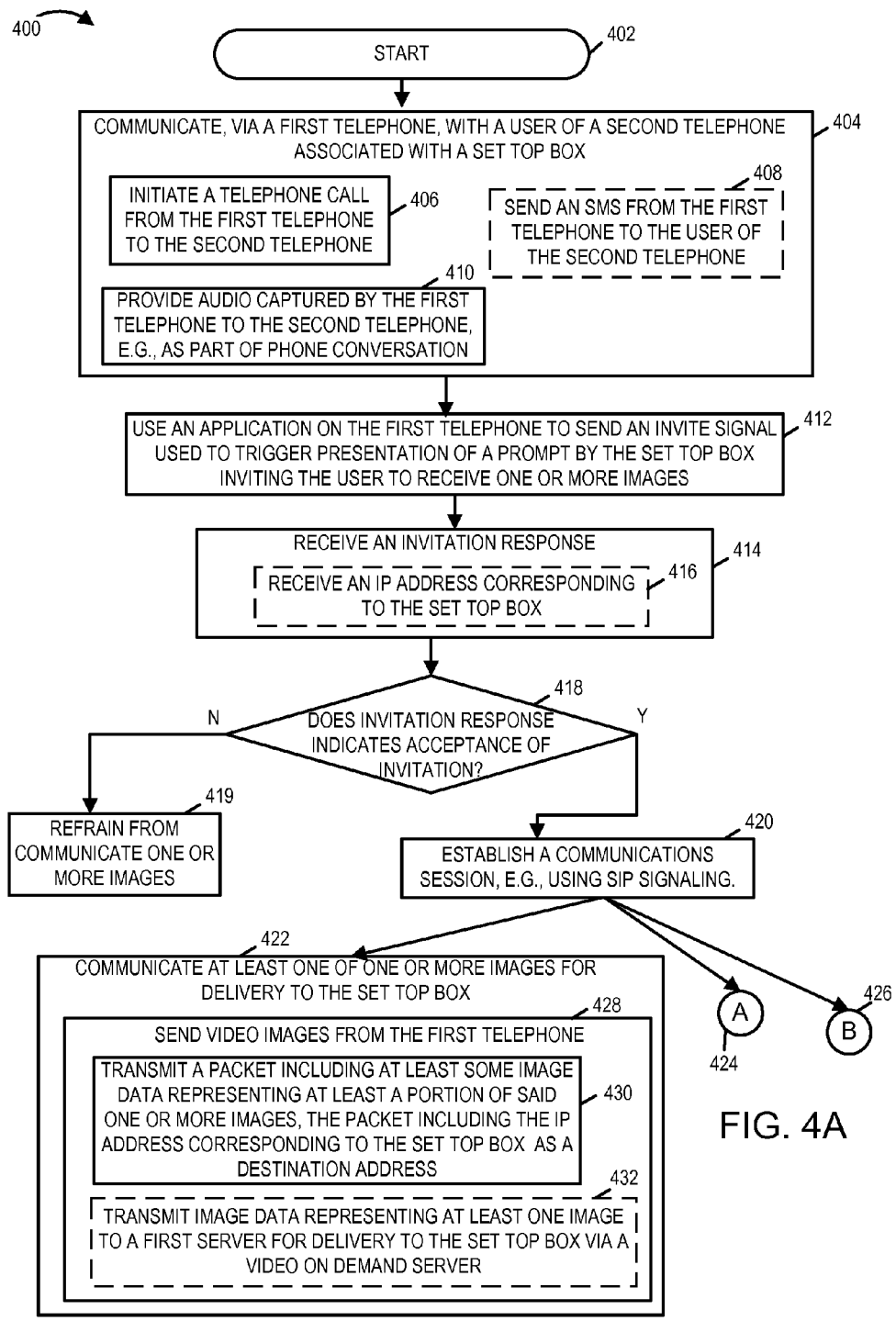
FIG. 4 which comprises the combination of FIGS. 4A and 4B, is a flowchart of an exemplary content delivery method, in accordance with one embodiment of the invention.
Figure 4B:
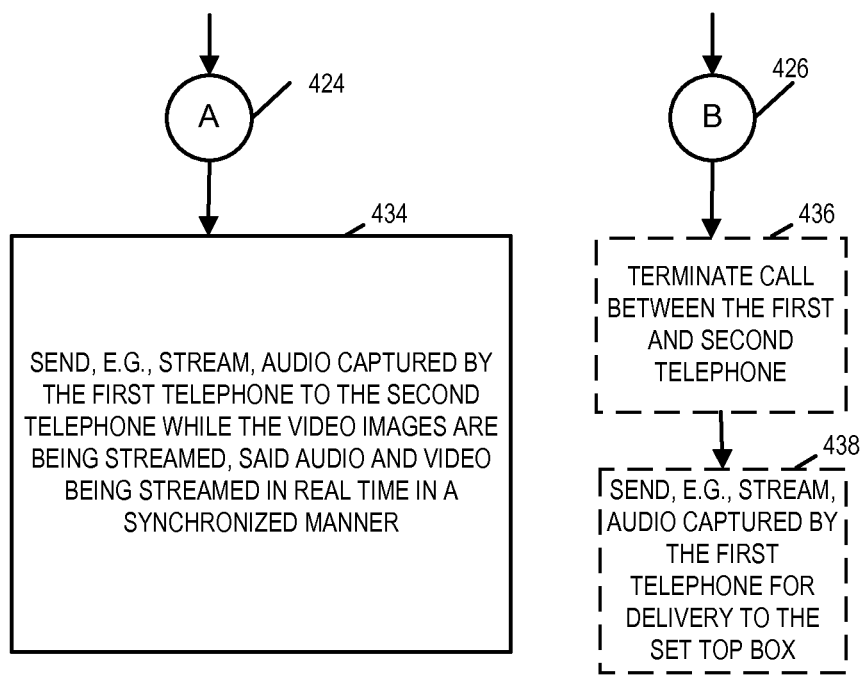

FIG. 4, which comprises the combination of FIGS. 4A and 4B, is a flowchart 400 showing the steps of an exemplary multimedia content delivery method, in accordance with an exemplary embodiment. In some embodiments the exemplary method shown in flowchart 400 is implemented by a first telephone, e.g., a mobile communications device such as MS 110, shown in FIG. 1. Thus for the purpose of discussion of flowchart 400, consider that MS 110 is the first telephone. To facilitate better understanding of the method 400, reference to FIGS. 2-3 may be made.

As shown in FIG. 4A, operation starts in step 402. In step 402 the first telephone, e.g., MS 110 is powered on, initialized. In step 404 a user of the first telephone 110 communicates with a user of a second telephone, e.g., user phone 112, associated with a set top box 116. In some embodiments communicating with the user of second telephone 112 includes performing one of steps 406 or alternatively step 408 which is shown using dashed box as an optional step. In step 406 the user of first telephone 110 initiates a telephone call from the first telephone 110 to the second telephone 112. For example a user X may communicate, e.g., call via the first telephone 110, with his friend Y, who is the user of second telephone 112. In one example the user X is watching an event, the user X asks during the phone conversation with user Y (user of home phone 112) if he/she would like to watch the game/event. If the user of second telephone 112 at the customer premise 104 is interested in watching the game/event. Consider that the user Y at the customer premise 104 is interested in watching the soccer game and therefore expresses interest in watching the game, e.g., while communicating with the user X of first telephone 110. Alternatively in some embodiments step 408 is performed instead of step 406. In step 408 the user X sends an SMS (short message service message) to the user of second telephone 112 to determine/ask if user Y is interested in watching the event being viewed by user X. Thus in embodiments where step 408 is performed instead of step 406, no telephone call to the second telephone 112 is made.

In some embodiments where step 406 is performed, step 410 is also performed as part of step 404 of communicating with the user of second telephone 112. In step 410 audio content captured by the first telephone 110 is provided to the second telephone 112, e.g., as part of the telephone conversation between user X and user Y. The audio content includes audio content captured from the event/game being watched by the user X of the first telephone 110.

Operation proceeds from step 404 to step 412. In step 412 the user X of first telephone 110 activates a video application on first telephone 110 and using the application to send an invitation signal, e.g., such as signal 24 of FIG. 2, used to trigger presentation of a prompt by the set top box 116 inviting the user to receive one or more images. As discussed in FIGS. 2-3, in some embodiments when the first telephone 110 user wants to send an invitation to another user such as user of second telephone 112 at customer premise 104, the first telephone 110 user activates the video application and puts identification information corresponding to the receiving user, e.g., e-mail address, phone number corresponding to the second telephone etc., as the destination address. In some embodiments, when activated, the video application on the first telephone 110 sends the invite signal to a first server, e.g., the IP multimedia server 132 located at the headend 102. In some embodiments the first telephone 110 includes information identifying a first server to which the invite signal 24 is directed. In various embodiments the first server 132 includes information, e.g., lookup tables, associating at least one of a telephone number of the second telephone or a user identifier identifying the user of the second telephone 112, with the set top box 116 associated with the second telephone 112. The information may be used for matching identification information, e.g., telephone number, included in the invite signal to the address of one or more STB devices located at a customer premise 104. Thus, when the IP multimedia server 132 receives the invitation intended to be sent to the customer at customer premise 104, the first server 132 matches the customer e-mail address, phone number or other identification information included in the received invite signal 26 with the STB 116 address, using the lookup tables. The first server 132 then sends the invite signal to the STB 116 (as shown in FIG. 2 using arrow 26). Upon receiving the invite signal STB 116 presents a prompt to the user of the second telephone 112 on a display device 118, e.g., TV, inviting the user to receive one or more images.

Operation proceeds from step 412 to step 414. In step 414 the first telephone 110 receives an invitation response signal in response to the invite signal 26. In some embodiments the step of receiving invitation response includes step 416 wherein an IP address corresponding to the set top box STB 116 is received. In some embodiments the IP address corresponding to the set top box 116 is one of: (i) an IP address of the set top box 116, or (ii) an IP address of the cable modem 114 located at the customer premise 104 at which second telephone 112 is located and which is coupled to set top box 116 as shown in FIG. 1. Step 416 is optional as indicated by the dashed box and is performed in some embodiments while not necessarily in others. In various embodiments the invitation response either indicates an acceptance of the invitation to receive one or more images, or a negative response where the user of STB 116 declines to receive one or more images.

Operation proceeds from step 414 to step 418. In step 418 the first telephone 110 determines if the received invitation response indicates acceptance of the invitation. If the response indicates an acceptance to receive one or more images, operation proceeds from step 418 to 420. If however the response indicates that user declined to receive one or more images, operation proceeds from 418 to step 419 where the first telephone 110 user refrains from communicating, e.g., transmitting, the one or more images for delivery to the STB 116.

Returning to step 420. In step 420 after having determined that the user of second telephone is interested in receiving one or more images from the first telephone 110, a communications session is established between the first telephone 110 and the STB 116, e.g., using session initiation protocol signaling. Although the first telephone 110 and the STB 1116 are the end devices in the communication session being established, in some embodiments one or more servers, e.g., such as multimedia server 132, still participate to facilitate establishment of a communication session between the end devices.

Operation proceeds from step 420 to step 422. Operation also proceeds from step 420 to step 434 via connecting node A 424 or optionally step 436 via connecting node B 426. In some embodiments steps 422, 434 (or optionally 436) may occur asynchronously, e.g., in parallel. In step 422 the first telephone 110 communicates at least one of said one or more images for delivery to the set top box 116. In various embodiments step 422 of communicating at least one image from said one or more images includes step 428 wherein the first telephone 110 sends video images from said first telephone 110. In some embodiments sending video images from said first telephone 110 includes performing one of steps 430 or 432. Steps 430 and 432 are alternatives and are performed in different embodiments. In some embodiments step 430 is performed wherein the first telephone transmits a packet including at least some image data representing at least a portion of said one or more images, the packet including the IP address corresponding to the STB 116 as a destination address. Thus in some embodiments at least some image data portion of the one or more images is sent from the first telephone 110 with the IP address corresponding to the STB 116 as the destination address. In some embodiments when said destination address is the IP address of the cable modem 114, the packet including the image data is delivered to the cable modem 114 which then forwards it to the STB 116.

In some embodiments the video images are sent to the STB 116 as part of an on demand communications session. In such embodiments, step 432 is performed rather than step 430. In step 432 the first telephone 110 transmits image data representing at least one image from said one or more images to the first server, e.g., multimedia server 132, for delivery to the set top box 116 via a video on demand server 144. This is illustrated in FIG. 3 example where processing related to signals 40 and 42 is discussed.

Each of the connecting nodes 424 and 426 leads to an individual processing path including one or more steps. One individual processing path may be adopted in a given embodiment and steps associated with that individual processing path are performed in that embodiment. In some embodiments processing path along connecting node A 424 is adopted and thus steps 434 is performed. Alternatively, in some other embodiments the path along connecting node B 426 is adopted and thus steps 434 to 438 are performed. Accordingly steps 436 and 438 are shown in dashed boxes as optional step.

In some embodiments the audio content corresponding to the one or more images or video sent by the first telephone (as discussed in step 422) is communicated from the first telephone 110 to the second telephone 112. In some such embodiments step 434 is performed wherein the first telephone 110 sends, e.g., streams, audio captured by the first telephone 110 to the second telephone while the video images are being streamed for delivery to the STB 116, the audio and video content being streamed in real time in a synchronized manner. The captured audio content is communicated, e.g., during the phone conversation between the first and second telephones 110, 112.

In some embodiments it is desirable to send both the captured audio content and the one or more images to the STB 116, so that both audio and video content is synchronously presented together, e.g., on a TV, and the user is able to see the images and hear the audio on the same device. In some such embodiments, as an alternative, steps 436 and 438 are performed. In step 436 the call between the first and second telephones 110, 112 is terminated. The call may be terminated when either the calling party, e.g., user of first telephone 110, or the called party, e.g., the second telephone 112, disconnects the call. In some embodiments the call is intentionally terminated prior to sending the audio for delivery to the STB 116. Operation proceeds from step 436 to step 438. In step 438 the first telephone 110 sends, e.g., streams, the audio captured by the first telephone 110 for delivery to the STB 116. In various embodiments the video, e.g., one or more images, and the audio are streamed from the first telephone 110 in real time in a synchronized manner.

Figure 5:
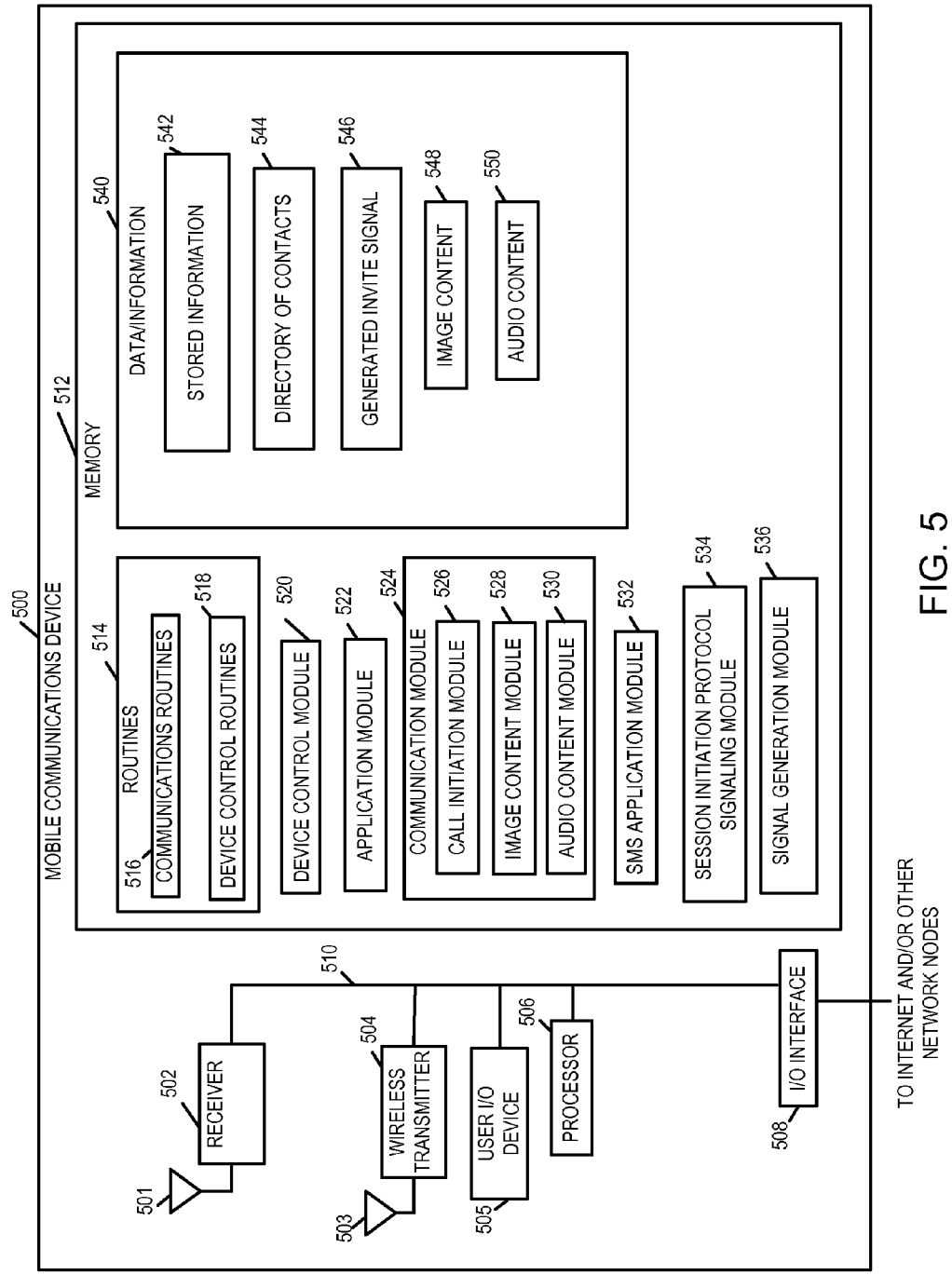
FIG. 5 illustrates an exemplary mobile communications device which can be used to implement the exemplary method of the flowchart of FIG. 4 to send content, e.g., one or more images, to home based devices, in accordance with one aspect of the invention.

FIG. 5 is a drawing of an exemplary mobile communications device 500 which may be used as the mobile station MS 110 of FIGS. 1-3, in accordance with an exemplary embodiment. The exemplary mobile communications device 500 is also referred to as the first telephone which implements the method of flowchart 400 discussed above. In some embodiments the mobile communications device 500 is a cellular mobile telephone, e.g., a handheld mobile station.

As shown in FIG. 5, exemplary mobile communications device 500 includes a receiver 502, a wireless transmitter module 504, user I/O devices 505, a processor 506, I/O interface 508 and memory 512 coupled together via a bus 510 over which the various elements may interchange data and information. The wireless transmitter 504 transmits various signals, e.g., invite signals, image and/or audio content signals. The mobile communications device 500 also includes a camera capable of capturing images and/or recording videos.

Receiver 502 is responsible for receiving signals from other devices. In some embodiment the receiver 502 includes a wireless receiver module and is coupled to a receive antenna 501 via which the mobile communications device 500 receives signals from other devices. Wireless transmitter 504 is coupled to transmit antenna 503 via which the communications device 500 transmits signals to other communications devices. In some embodiments, the same antenna is used for the receiver and the transmitter.

Memory 512 includes routines 514, various modules and data/information 540. The processor 506, e.g., a CPU, executes the routines 514 and one or more modules discussed below and uses the data/information 540 to control the operation of the communications device 500 to implement methods, e.g., the method of flowchart 400 of FIG. 4 and/or the methods in accordance with the invention.

Routines 514 include a communications routine 516 and device control routines 518. The communications routine 516 implements the various communications protocols used by the mobile communications device 500. The device control routines 518 are used by the control module 520 to control the operation of various elements of the mobile communications device 500.

Modules included in the memory 512 include an application module 522, a communications module 524, an SMS application module 532, a session initiation protocol (SIP) signaling module 534 and a signal generation module 536.

The application module 522 includes the application used by a user of mobile communications device 500 for sending an invite signal to trigger presentation of a prompt by the set top box 116 inviting the user of set top box 116 to receive one or more images. The receiver 502 is also responsible for receiving response signals which may be sent by one or more other devices, e.g., such as STB 116, in response to the invite signal. The receiver module 502, in some embodiments, is also configured to receive an IP address corresponding to the set top box 116 in response to the invite signal.

The communications module 524 is used for communicating with a user of a telephone, e.g., second telephone 112, associated with a set top box, e.g., STB 116. For example, the user is a user of the set top box 116 and the telephone 112 located at the customer premise 104. In various embodiments the communications module 524 includes a call initiation module 526 used by the device 500 for initiating a telephone call from said mobile communications device 500 to the second telephone 112, e.g., when the user of mobile device 500 wishes to call the user of second telephone 112.

In some embodiments communications module 524 is configured to communicate at least one or more images from said mobile communications device for delivery to said set top box 116, when the invitation response signal from set top box 116 indicates acceptance of an invitation to receive one or more images. In some embodiments the one or more images are part of a video. In some embodiments the communications module 524 includes an image content module 528 for streaming video images from said mobile communications device as part of communicating at least one of said one or more images. The communications module 524 in some embodiments includes an audio content module 530 for sending, e.g., streaming, audio captured by said mobile communications device 500 to the telephone 112 while the video images are streamed, said audio and video being streamed in real time in a synchronized manner. In still some embodiments, communications module 524 is configured to send both audio and video content, e.g., content captured by the mobile communications device 500, from the mobile communications device 500 to be delivered to the set top box 116. In some embodiments the communications module 524 controls the transmitter 504 to transmit a packet including at least some image data representing at least a portion of one or more images, said packet including the IP address corresponding to the set top box 116 as a destination address. In some embodiments the communications module 524 controls the transmitter 504 to transmit at least one image to a first server, e.g., multimedia server 132, for delivery via a video on demand server, e.g., VOD server 144, to the set top box 116.

The SMS application module 532 is for sending SMS messages to other devices, e.g., to send SMS to the telephone 112. In at least one embodiment the telephone 112 is capable of receiving SMS messages. The control module 520 uses control routines 518 to control the operation of device 500 and/or one or more elements therein. For example, the control module 520 controls the communications module 524 to terminate communications between said mobile communications device 500 and said telephone 112, e.g., when either the user of device 500 or the user of 112 pushes a button to end the call between the mobile device 500 and the telephone 112.

The Session Initiation Protocol (SIP) signaling module 534 is responsible for establishing a communications session using SIP signaling with the set top box 116. In various embodiments the communication session is established prior to communicating, e.g., streaming, at least a portion of the one or more images to be delivered to the set top box 116. The signal generation module 536 is responsible for generating one or more signals in accordance with the invention. For example, the signal generation module 536 generates the invite signal when the user activates the application, e.g., included in the application module 522, to invite the user of telephone 112 to receive one or more images.

Data/information 540 includes a plurality of stored sets of data/information including stored information 542, directory of contacts 544, generated invite signal 546, image content 548, and audio content 550. Stored information 542 includes information identifying the first server 132 to which the invite signal is directed. Directory of contacts 544 include information regarding contacts of the user of mobile communications device 500, e.g., friends, coworkers, family members etc. The contact information included in Directory of contacts 544 may include telephone number(s), address, e-mail address etc., corresponding to various contacts of the user of mobile device 500.

Generated invite signal 546 is an output of the signal generation module 536, and is generated to invite another user, e.g., a friend, to view one or more images in accordance with one feature of the invention. Image content 548 includes one or more images to be communicated from the mobile communications device 500 to be delivered to the set top box 116, and audio content 550 includes the audio, e.g., background sound, captured by the mobile communications device 500. The audio content 550 in some embodiments is sent to the second telephone 112 from the mobile device 500 as part of the phone conversation between the user of first telephone, i.e., mobile device 500, and the second telephone 112. In some embodiments the audio content 550 is delivered to the set top box 116 along with the video content 548.

Figure 6:
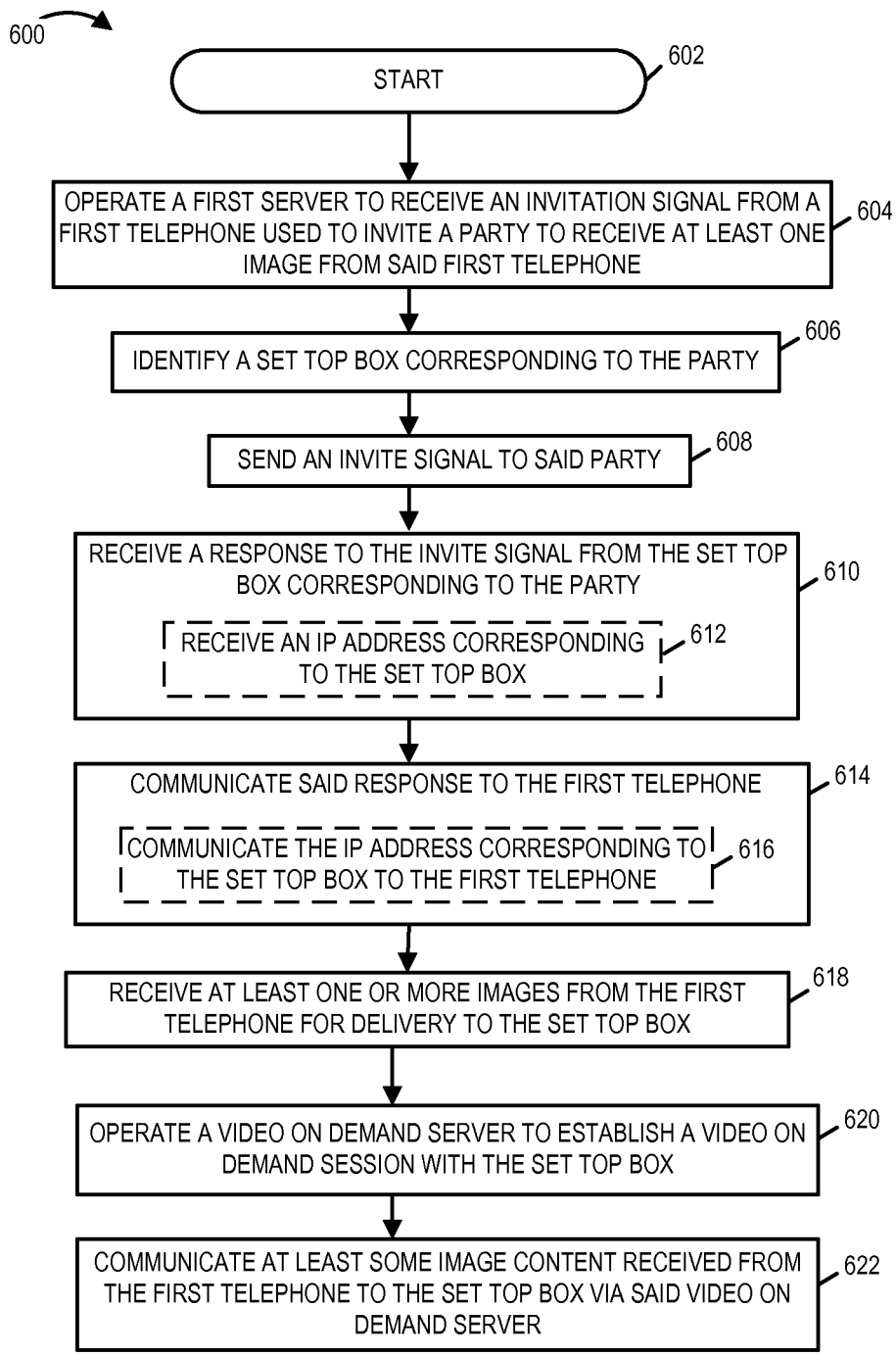
FIG. 6 is a flowchart illustrating the steps of an exemplary method of operating a network headend to support delivery of content, e.g., image and audio content, from telephones, in accordance with one embodiment of the invention.

FIG. 6 illustrates a flowchart 600 showing the steps of an exemplary method of operating a network headend including a first server to support delivery of content, e.g., one or more images, from telephones, in accordance with an exemplary embodiment. In some embodiments the exemplary method shown in flowchart 600 is implemented by the network headend 102 (or one or more elements therein) shown in FIG. 1. In one exemplary embodiment discussed with regard to flowchart 600 example, the first server is the IP multimedia server 132.

As shown in FIG. 6, operation starts in step 602. In step 602 the network headed 102 is powered on, initialized. In step 604 a first server, e.g., IP multimedia server 132, is operated to receive an invitation signal, e.g., such as signal 24 illustrated in FIG. 2, from a first telephone such as MS 110, said invitation signal being used to invite a party to receive at least one image from the first telephone 110. Operation proceeds from step 604 to step 606. In step 606 the first server 132 identifies a set top box corresponding to the invited party. For the purpose of discussion consider that the party being invited is the user of telephone 112 located at the customer premise 1 104, and the set top box corresponding to the invited party is STB 116. In various embodiments the invitation signal 24 received from the first telephone 110 includes at least some identification information corresponding to the invited party, e.g., such as telephone number of a telephone used by the invited party, e.g., user phone 112, where the telephone 112 is associated set top box 116 corresponding to said party. In various embodiments for identifying the set top box corresponding to the invited party, the first server 132 uses at least one of a telephone number or a party identifier included in said invitation signal 24 to identify the set top box corresponding to said party. The first server 132 in some embodiments access stored information mapping a telephone number or party identifier such as an E-mail address or IP address of the party to a STB corresponding to the party and its corresponding IP address. The stored information may be stored in the first server or a separate database in headend 102 which can be accessed by the first server 132.

Operation proceeds from step 606 to step 608. In step 608 the first server 132 sends an invite signal, e.g., such as signal 26 illustrated in FIG. 2, to said party, e.g., to the STB 116 corresponding to the user at customer premise 1 104. Operation proceeds from step 608 to step 610 wherein the first server 132 receives a response to the invite signal 26, from the set top box 116 corresponding to the party. One example of such a response signal is shown as signal 36 in FIG. 2. In some embodiments, receiving a response to the invite signal from the set top box 116 includes receiving an IP address corresponding to the set top box 116 as shown in sub-step 612. In some embodiments the IP address is included in the response to the invite signal received from the set top box 116.

Operation proceeds from step 610 to step 614. In step 614 the first server 132 communicates the response received from the set top box 116 to the first telephone 110. In some embodiments the first server 132 also communicates the IP address corresponding to the set top box 116 to the first telephone 110, as indicated in sub-step 616. In various embodiments depending on the response from the invited party, the user of the first telephone decides whether or not to send one or more images for delivery to the set top box 116. For the purpose of discussion, consider that the response indicates that the invited party has accepted to receive one or more images from the first telephone 110.

Operation proceeds from step 614 to step 618. In step 618 first server 132 receives content, e.g., at least one or more images, from the first telephone 110 to be delivered to the set top box 116 corresponding to the invited party. The content may, and in some embodiments is received at the first server 132 over the internet. The operation proceeds from step 618 to step 620. In step 620 a video on demand server, e.g., VOD server 144, is operated to establish a video on demand session with the set top box 116. In some embodiments the VOD server 144 is instructed, e.g., by the first server 132, to establish an on demand session with the set top box 116 so that the content received from the first telephone 110 can be communicated to the set top box 116 via the VOD server 144.

Operation proceeds from step 620 to step 622. In step 622 at least some image content received from the first telephone 110 is communicated to the set top box 116 via the VOD server 144. In some embodiments the at least some image content is communicated to the set top box 116 via the VOD server 144 over the cable network 176. In some embodiments the video on demand server 144 delivers image content obtained from said first telephone 110 for display, while audio content captured by the first telephone 110 is communicated from the first telephone 110 to the second telephone 112, e.g., as part of the phone conversation. Thus in some embodiments the audio content and/or the background sound captured by the first telephone 110 is communicated to the second telephone 112 during the phone conversation between the first and second telephone users. In some other embodiments the video on demand server 144 delivers image content obtained from said first telephone 110 and audio content obtained from said first telephone for output after communication between said first telephone 110 and said second telephone 112 is terminated, e.g., due to the call being terminated by either the user of first telephone 110 or the user of second telephone 112.

Figure 7:
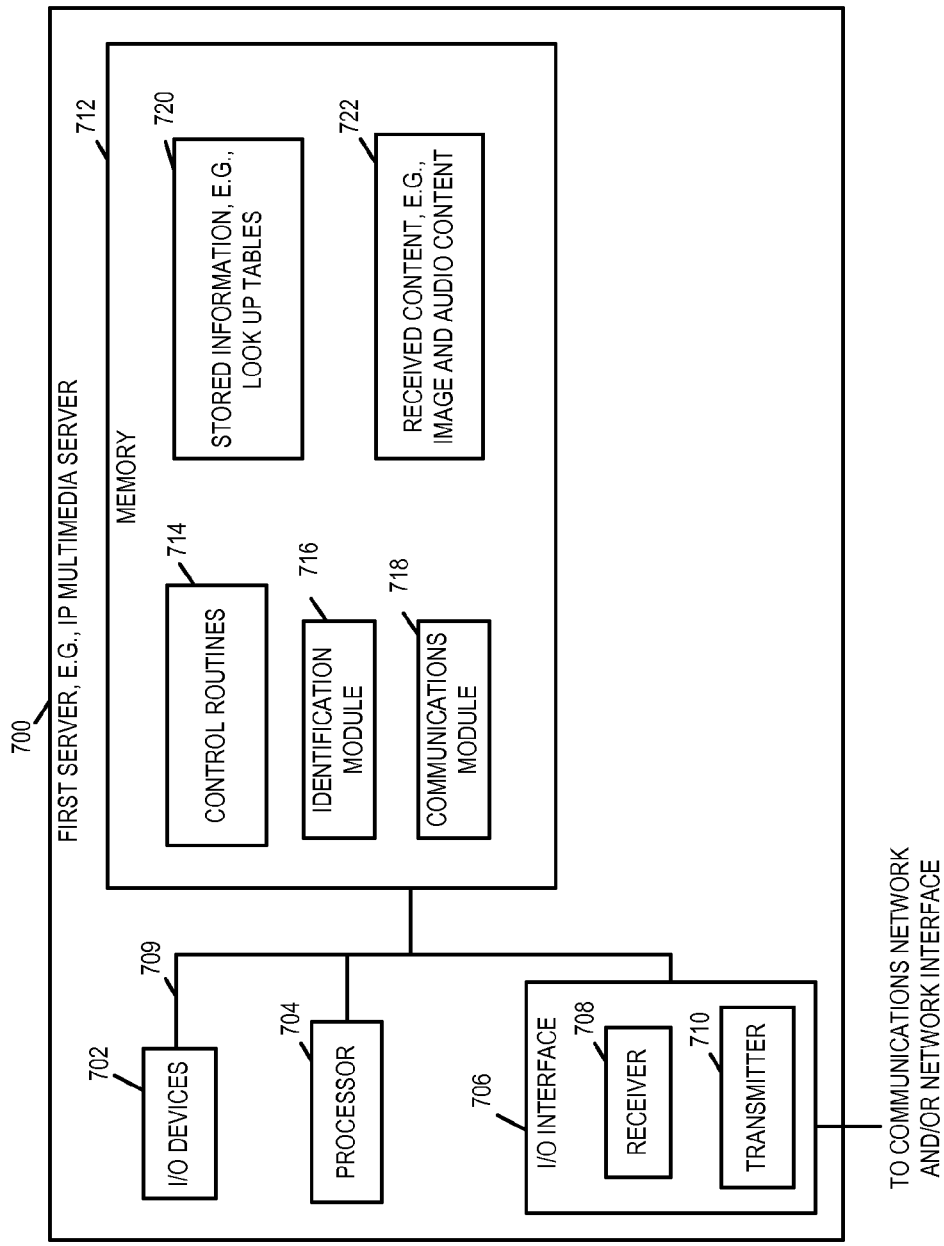
FIG. 7 illustrates an exemplary first server that may be used as the IP multimedia server shown in FIGS. 1-3, implemented in accordance with one embodiment of the invention.

FIG. 7 illustrates an exemplary first server 700 implemented in accordance with the invention. The exemplary first server 700 may be used as the IP multimedia server 132 of the system shown in FIG. 1. As illustrated, the first server 700 includes I/O devices 702, a processor 704, an I/O interface 706, and a memory 712 coupled together by a bus 709. The I/O interface includes a receiver 708 and a transmitter 710. The receiver 708 is responsible for receiving and processing messages, replies, information, content, e.g., image and audio content, and/or control signals while the transmitter 710 is responsible for generating and sending messages, signals, replies and information. Both the receiver 708 and transmitter 710 work under direction of the processor 704 which executes one or more of the routines and/or modules included in memory 712 to control the operation of one or more elements in the server 700. For example, the receiver 708 is used for receiving an invitation signal from a first telephone, e.g., MS 110, used to invite a party to receive at least one image from the first telephone. Thus, via the I/O interface 706, the server 700 can receive and/or send content, e.g., image and audio content, messages, commands, etc. The first server 700 is capable of receiving and sending signals, content etc., over the internet and/or over the cable network such as the cable network 176.

The memory 712 includes control routines 714 which control overall server 700 operation in accordance with the invention. Control routines 714 may operate in conjunction with various modules which are used to perform various functions. Modules included in the memory 712 include an identification module 716 and a communications module 718. The memory 712 also includes stored information 720, and received content 722, e.g., received image and audio content.

The identification module 716 may use stored information 720 to identify a set top box corresponding to an invited party when an invitation signal is received by the first server 700 from a telephone, e.g., from mobile communications device 110, to invite a party such as user of telephone 112 to view one or more images in accordance with the invention.

Stored information 720 includes information used for mapping or associating identification information corresponding to a customer, e.g., such as a telephone number, user identifier, e-mail address, with a set top box associated with that customer. In one embodiment stored information 720 includes information associating at least one of i) a telephone number, ii) a user identifier identifying the user of the telephone, with a set top box. For example the stored information may include information mapping the telephone number corresponding to the user telephone 112 to the set top box 116, or information mapping a user identifier identifying the invited party, e.g., the user at the customer premise 104, to the set top box 116. The stored information 720 may be in the form of a lookup table which maps the telephone, user identifier, or user e-mail address, to the set top box address, e.g., IP address or MAC address. Thus the identification module 716 may, and in some embodiments does, use the stored information to determine the set top box to which messages or signals can be sent to contact the invited party. In some embodiments the at least one of the telephone number and a party identifier corresponding to an invited party is included in the invitation signal received from the first telephone 110.

The communications module 718 is used for sending e.g., via the I/O interface 706, an invite signal to the set top box corresponding to an invited party, e.g., STB 116 of the user at customer premise 104. In various embodiments the receiver 708 is further configured to receive and process a response to the invite signal from the set top box 116 corresponding to the invited party. In some such embodiments the response received from the set top box 116 includes an IP address corresponding to the set top box 116. The communications module 718 is further configured to communicate, the response to the invite signal, to the first telephone 110. In some embodiments the communications module 718 is further configured to communicate the IP address corresponding to the set top box 116 to the first telephone 110. In some embodiments the communications module 718 is configured to communicate, e.g., via the I/O interface 706, at least some image content received from the first telephone 110 to the set top box 116 via a video on demand server, e.g., VOD server 144. In some embodiments the communications module 718 allows the first server 700 to insert, using eBIF (enhanced binary interchange format) or another format, information to be presented into a control signal and/or content stream.

Depending on the capabilities of STBs associated with different users, some called parties may receive video via IP signals while others receive video from a cell phone via on an analog based VOD session.

The application on the user's cell phone used to control video streaming may, and in some embodiments does, transmit rights management information, sometimes called digital rights management information, with the transmitted images and/or video. The digital rights management information may be set, e.g., specified by, the user of the cell phone sending the images. For example, a girl sending images to a boyfriend may set the DRM information to restrict duplicating, forwarding or sharing of the images. The DRM may also include a delete date at which time the images will be removed from the customer premise device, e.g., STB, to which they are sent and/or deleted from storage at the VOD server. By allowing individual DRM settings which will be enforced by the network controlled devices, e.g., VOD server or STB owned by the cable network provider, users of the service can feel more comfortable sending images which they would not like to send using conventional techniques for sending pictures from cell phones.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A multimedia content delivery method, the method comprising:
   communicating with a user of a second telephone, associated with a first customer premise device capable of outputting images to a display unit which is part of said customer premise device or coupled to said customer premise device, via a first telephone;
   using an application on said first telephone to send a first invite signal, while said first telephone is in communication with said second telephone, said first invite signal including a telephone number of the second telephone, an Email address corresponding to a user of the second telephone, or a user identifier identifying the user of said second telephone, to trigger presentation, by said first customer premise device, of a prompt on the display unit inviting said user of said second telephone to receive one or more images;
   communicating, via a different communications path than used to communicate between said first telephone and said second telephone, at least one of said one or more images for delivery to the first customer premise device which is used to display said one or more images; and
   wherein communicating with the user of the second telephone includes providing audio captured by said first telephone to said second telephone which is used to output audio from said first telephone while said first customer premise device outputs said at least one of said one or more images for display.

2. The method of claim 1, wherein said first customer premise device is a set top box, the method further comprising:
   sending both audio and video, to be delivered to said set top box, from said first telephone to said set top box after communication between the first telephone and the second telephone is terminated.

3. The method of claim 1, wherein said first customer premise device is a set top box, the method further comprising:
   prior to communicating at least one of said one or more images, receiving an invitation response; and
   wherein said step of communicating at least one of said one or more images from said first telephone for delivery to said set top box is performed when said invitation response indicates acceptance of said invitation.

4. The method of claim 3,
   wherein receiving an invitation response includes receiving an IP address corresponding to said set top box; and
   wherein communicating at least one of said one or more images includes transmitting a packet including at least some image data representing at least a portion of said one or more images, said packet including said IP address as a destination address.

5. The method of claim 4, wherein said IP address corresponding to said set top box is one of: i) an IP address of said set top box or ii) an IP address of a cable modem located at the customer premise of said user at which said second telephone is located and which is coupled to said set top box.

6. The method of claim 1, wherein said first invite signal includes the Email address corresponding to a user of the second telephone.

7. The method of claim 6, further comprising: operating a server to receive said invite signal and match said Email address to an address of said first customer premise device; and
   send the invite signal to said first customer premise device.

8. The method of claim 7, wherein said first customer premise device is a STB and wherein said address of said first customer premise device is a STB address.

9. A first mobile communication device, comprising: a wireless transmitter configured to transmit signals;
   a communication module configured to communicate with a second telephone associated with a set top box; and
   an application configured to send an invite signal to trigger presentation of a prompt on a display unit by said set top box inviting a user of said second telephone to receive one more images, said invite signal being sent while said mobile communication device is in audio communication with said second telephone, said invite signal including a telephone number of the second telephone or a user identifier identifying a user of said second telephone, and
   wherein said communication module is further configured to provide audio captured by said first mobile communications device to said second telephone via a first communications path to be output from said second telephone while said first customer premise device outputs one or more images communicated from said first mobile communications device to the first customer premises device, via a second communications path which is different from said first communications path, for display.

10. The mobile communications device of claim 9, wherein said communication module is configured to send both audio and video content from said mobile communications device to be delivered to said set top box after termination of audio communication with said second telephone.

11. The mobile communications device of claim 9, further comprising:
    a receiver module for receiving a response to said first invite signal; and
    wherein said communications module communicates at least one of said one or more images from said mobile communications device for delivery to said set top box, when said response indicates acceptance of an invitation to receive said one or more images.

12. The mobile communications device of claim 11,
    wherein said receiver module is also configured to receive an IP address corresponding to said set top box in response to said invite signal; and
    wherein said communications module is configured to control said wireless transmitter to transmit a packet including at least some image data representing at least a portion of said one or more images, said packet including said IP address as a destination address.

* * * * *